United States Patent [19]

Goode

[11] Patent Number: 4,574,904

[45] Date of Patent: Mar. 11, 1986

[54] AUXILLIARY STEERING SYSTEM

[75] Inventor: Frederick R. Goode, Lexington, Ky.

[73] Assignee: FMC Corporation, Chicago, Ill.

[21] Appl. No.: 576,830

[22] Filed: Feb. 3, 1984

Related U.S. Application Data

[63] Continuation-in-part of Ser. No. 469,342, Feb. 24, 1983, abandoned.

[51] Int. Cl.[4] .............................................. B62D 5/06
[52] U.S. Cl. ...................................... 180/133; 60/404
[58] Field of Search ................. 180/133, 140; 60/404, 60/418, 413

[56] References Cited

U.S. PATENT DOCUMENTS

| | | | |
|---|---|---|---|
| 3,724,585 | 4/1973 | Conrad | 180/140 |
| 3,918,847 | 11/1975 | Junck | 60/418 |
| 3,922,854 | 12/1975 | Coeurderoy | 60/413 |
| 4,085,587 | 4/1978 | Garlinghouse | 60/404 |
| 4,217,968 | 8/1980 | Dezelan | 180/133 |
| 4,303,089 | 12/1981 | Gage et al. | 180/133 |
| 4,326,558 | 4/1982 | Gage | 180/133 |

FOREIGN PATENT DOCUMENTS

| | | | |
|---|---|---|---|
| 2052085 | 4/1972 | Fed. Rep. of Germany | 180/140 |
| 2017848 | 10/1979 | United Kingdom | 60/404 |

Primary Examiner—John A. Pekar
Attorney, Agent, or Firm—Ronald C. Kamp; Richard B. Megley

[57] ABSTRACT

An auxilliary hydraulic steering system for use on mobile vehicles having an engine-driven pump supplying hydraulic fluid under pressure to a steering control unit and an accumulator. The accumulator is charged with fluid under pressure from the pump through a charge/discharge valve and connects with the supply line to the steering control unit only when this valve shifts in response to a predetermined pressure in said supply line.

3 Claims, 2 Drawing Figures

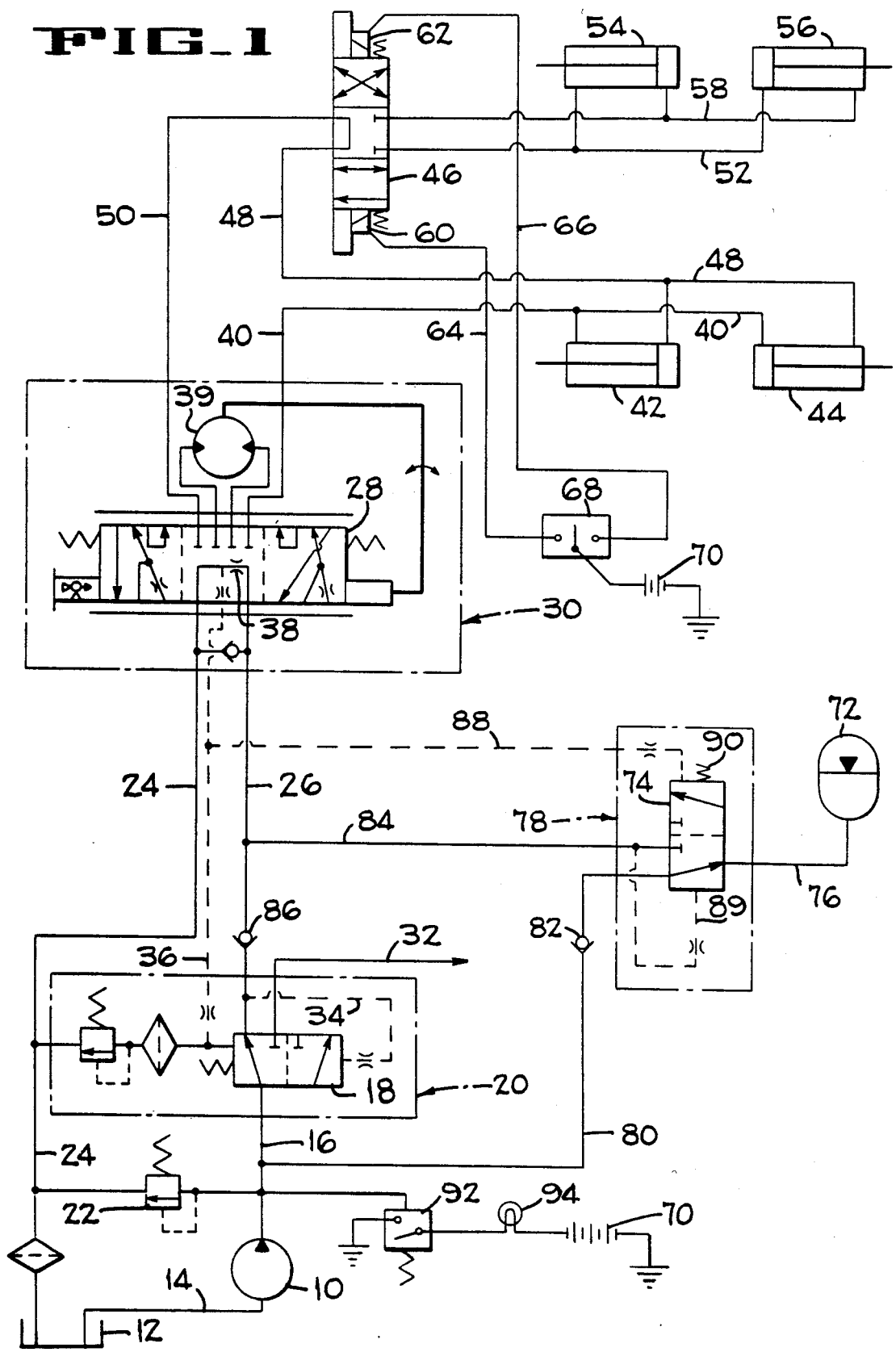
FIG_1

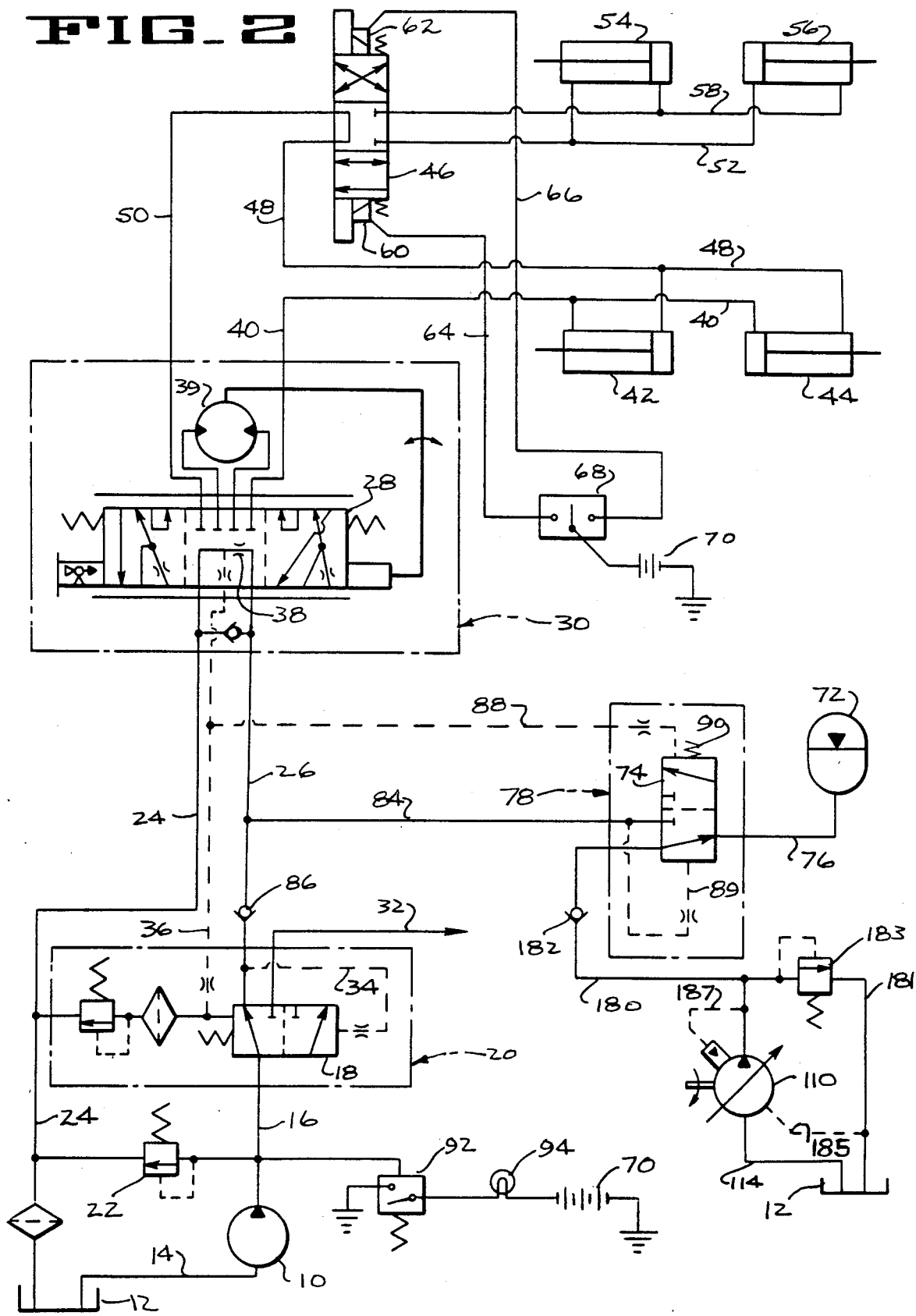
FIG_2

AUXILLIARY STEERING SYSTEM

This application is a continuation-in-part of patent application Ser. No. 469,342 filed Feb. 24, 1983, now abandoned.

This invention relates to auxilliary hydraulic steering systems for mobile vehicles and, more particularly, to such system which utilize an accumulator to store the energy needed for auxilliary steering.

BRIEF DESCRIPTION OF THE DRAWINGS

FIG. 1 is an electrical and hydraulic schematic of one embodiment of the present invention.

FIG. 2 is a schematic similar to FIG. 1, illustrating another embodiment of the present invention.

DETAILED DESCRIPTION

Referring to the embodiment illustrated in FIG. 1, the mobile vehicle incorporating the present invention has a power source, not shown, but usually an internal combustion engine, which drives a fixed displacement, hydraulic pump 10. Hydraulic fluid is supplied to the suction side of the pump 10 from a reservoir 12 through a conduit 14. Hydraulic fluid under pressure is discharged into a supply conduit 16 connected between the discharge of pump 10 and a priority valve 18 included within a commercially available valve unit 20. In conventional manner, a pressure relief valve 22 is connected between supply conduit 16 and a return conduit 24 which discharges into reservoir 12. A conduit 26 connects priority unit 30. A high pressure carryover conduit 32 connects priority valve 18 with open center valve(s) (not shown) for control of other hydraulically actuated components on the mobile vehicle. The valve 18 is spring biased to the position shown in the drawing, wherein conduits 16 and 26 are in communication and conduit 32 is blocked and will maintain that position until the pressure differential between the two pilot lines 34 and 36 reaches approximately 100 psi. This pressure differential is created by fluid flow through the orifice 38 in the valve 28, the pilot line 36 communicating with the downstream side of the orifice 38 and the pilot line 34 being internally connected in valve unit 20 to supply conduit 26 on the upstream side of orifice 38. As flow through orifice 38 increases, which occurs as steering valve 28 returns to its center neutral position, the pressure drop across orifice 38 also increases. When this pressure drop reaches approximately 100 psi, the pressure in pilot line 34 exerts a force greater than the combined force of the spring bias and of that pressure acting through pilot line 36, causing the valve 18 to shift to the left, as viewed in the drawings. When so shifted to the left, the valve 18 connects supply conduit 16 with the conduit 32 so that high pressure hydraulic fluid is available for operation of the aforementioned components, while giving priority on demand to the steering valve for the output of pump 10.

The position of steering valve 28 is determined by the output of a bi-directional hand pump 39, provided in commercially available unit 30, which is physically connected to rotate with a conventional operator-manipulated steering wheel in the operator compartment or cab of the mobile vehicle. A hydraulic conduit 40 connects with either the supply conduit 26 or the return conduit 24, depending upon the direction of rotation (clockwise or counter-clockwise) of the hand pump 28 as determined by the operator's rotation of the steering wheel, and in parallel with the rod end of steering cylinder 42 and the head end of steering cylinder 44. The steering cylinder 42 and 44 are physically connected to steerable, ground-engaging wheels (not shown) in a conventional Ackermann steering arrangement. The cylinders 42 and 44 are preferably arranged to provide steering on what may be defined as the front axle of the mobile vehicle. The head end of cylinder 42 and the rod end of cylinder 44 are connected in parallel with a steering mode select valve 46 through conduit 48. A second conduit 50 connects select valve 46 with the steering valve 28. The select valve 46 is an open center type and is spring biased to its center position, as shown in the drawings, wherein conduit 48 and 50 are in communication. A conduit 52 connects the rod end of a steering cylinder 54 and the head end of a steering cylinder 56 in parallel to the select valve 46. Another conduit 58 connects the head end of cylinder 54 and the rod end of cylinder 56 in parallel to the select valve 46. Shifting the select valve 46 connects conduit 48 to conduit 52 and conduit 58 to conduit 50, effectively connecting the cylinders 42 and 44 in series with the cylinders 54 and 56 and either 4-wheel crab-steer or coordinated 4-wheel steer is achieved depending upon whether valve 46 is shifted upward or downward. The cylinders 54 and 56 are connected to ground-engaging wheels in a similar Ackermann arrangement to define an axle on the rearward end of the vehicle so that 4-wheel crab-steer is provided when all four wheels are angled in the same direction and 4-wheel coordinated steer is provided when the wheels on the rear are angled in a direction opposite the front wheels. The mode select valve 46 is shifted from the center position, to which it is normally spring biased, by selectively energizing one of a pair of solenoids 60 and 62, which are connected by conductors 64 and 66 respectively to separate terminals of a center-off, double pole, single throw electric switch 68 located in the cab. Throwing the switch 68 in either direction from its center-off position, as shown in the drawing, will connect one of the conductors 64 and 66 with the battery 70 and energize the associated solenoid 60 and 62, thereby causing the valve 46 to shift from its center position to provide either 2 axle crab or coordinated steering of the vehicle.

An accumulator 72, which functions as a storage means for the energy required for auxilliary steering, is connected with a charge/discharge control valve 74 through a conduit 76. The control valve 74 is a two position valve and may be a conventional priority valve marketed commercially as unit 78 to include sensing passages with dampening orifices. In the charge position shown in the drawing, the conduit 76 connects with a charge conduit 80; the latter conduit connecting with supply conduit 16. A check valve 82 in conduit 80 permits fluid flow there through only toward the valve 74, and fluid pressure from the pump is directed to the accumulator 72 when the pressure therein is lower than pump pressure. A discharge conduit 84 connects the valve 74 with conduit 26. The conduit 26 has a check valve 86 therein just upstream of its connection with conduit 84, which check valve prohibits back flow toward the valve 18 and thereby isolates the auxilliary steering system from the rest of the hydraulic system on the mobile vehicle during the auxilliary steering mode of operation. This operational mode is initiated upon the valve 74 being shifted downward to its discharge position wherein conduit 80 is blocked and conduits 76 and 84 are in communication. When in this discharge position, the fluid under pressure in the accumulator 72 is available for directional and volume distribution to the select valve 46 by the steering control unit 30. The position of the valve 74 is determined by the forces acting on each end. A pilot passage 89 communicates the pressure in conduit 84 to the lower end of valve 74 and urges this valve to the charge position shown. A pilot conduit 88 connects the pilot conduit 36 with the upper end of valve 74. The force of this pressure is added to the force of spring 90 to the valve 74 downward its discharge position. The difference in the pressures in pilot passage 89 and pilot conduit 88 is determined by the flow through orifice 38 and the resulting pressure drop thereacross. The spring 74 is adjusted or selected so that the valve 74 shifts downward at a predetermined pressure differential, e.g. 75 psi. Loss in pressure, whether through engine failure or pump failure, is detected by a pressure switch 92, which closes at or near the predetermined pressure to activate a warning device, such as indicator lamp 94, to alert the operator that the system is about to enter auxilliary steering mode.

MODE OF OPERATION

When in a non-steering mode, the valve 18 will initially be biased to the position shown wherein fluid from pump 10 is directed to conduit 26, through orifice 38 and returned to the reservoir 12 through conduit 24. When the flow through orifice 38 develops a predetermined pressure differential, e.g. 100 psi, between pilot lines 34 and 36, the valve 18 will shift to the left, blocking conduit 26 and routing pump flow to auxilliary valves through conduit 32.

When the steering wheel is turned, during normal steering mode, the hand pump 39 causes the steering valve to shift. The pressure differential between pilot lines 36 and 34 will then be less than 100 psi permitting the spring bias to position the valve 18 as shown in the drawing. When the flow through orifice 38 has decreased to the point that the pressure drop reaches 100 psi again, the priority valve 18 will shift to the left connecting conduit 32 with supply conduit 16.

Auxilliary steering mode will be initiated automatically whenever the pressure differential between conduits 26 and 36 drops below 50 psi. This low pressure differential will cause the spring 90 to shift the valve 74 to its discharge position. In this position the accumulator 72 is connected with the steering control unit 30 through conduits 84 and 26, with check valves 86 and 82 isolating the auxilliary steering system from the rest of the hydraulic system. The steering system will then function using the steering control unit 30 and fluid pressure provided from the accumulator 72 through the valve 74 in its discharge position. It should be noted that the accumulator 72 is isolated from lower pressures encountered in the hydraulic system so that the accumulator is at full pressure, assuming the working pressures encountered have been sufficient to fully charge the accumulator, when the auxilliary steering system is activated at a predetermined pressure differential between conduits 26 and 36.

The embodiment shown in FIG. 2 is similar to the embodiment illustrated in FIG. 1; the difference being in the arrangement for charging the accumulator 72. The FIG. 1 embodiment utilizes the fixed displacement pump 10 to charge the accumulator 72 and if there is no demand for steering, i.e. the steering pump 39 has not been rotated by manual input through the steering wheel, and there is no demand in the power-beyond circuit, then the accumulator 72 may not be fully charged. Hydraulic fluid will always follow the path of least resistance and that path will be back to reservoir unless there is a requirement for pressure in either the steering circuit or the power-beyond circuit. The embodiment of FIG. 2 provides an enhancement of the FIG. 1 circuit by connecting a separate and independent pump 110 to supply fluid pressure directly to the accumulator 72. The pump 110 is connected to the reservoir 12 through a conduit 114 to draw hydraulic fluid therefrom and to the valve 74 through conduit 180. The valve 74 functions in same manner as previously described with regard to FIG. 1, viz. that the conduit 180 communicates with conduit 76 when the pressure differential between conduit 26 and pilot conduit 36 exceeds a predetermined amount, e.g. 50 psi, and conduit 180 is blocked when the aforementioned pressure differential is less than the predetermined amount. A check valve 182, similar to valve 82, is interposed in conduit 180 to permit fluid flow only from the pump 110 toward the valve 78. In order to minimize power loss through pump 110 when the accumulator 72 is fully charged, a branch conduit 181 connects with discharge conduit 180 and contains a pressure relief valve 183. The pump 110 is of the variable displacement type with pressure compensation, sensed through pilot lines 185 and 187, to de-stroke the pump 110 when the accumulator 72 is fully charged. Thus, regardless of demand for power in any other part of the total hydraulic circuit, the pump 110 will immediately bring the accumulator 72 to a full charge and complete auxilliary steering capability will be readily available.

While two embodiments of the present invention have been shown and described herein, it will be appreciated that various changes and modifications may be made therein without departing from the spirit of the invention as defined by the scope of the appended claims.

What is claimed is:

1. An auxiliary steering system for a mobile vehicle having at least one axle with steerable ground-engaging wheels; comprising:
   a first engine-driven pump for supplying hydraulic fluid under pressure;
   a first steering cylinder connected to said wheels to determine angular orientation thereof;
   an operator-manipulated steering control unit interposed between said first pump and steering cylinder to control the flow of hydraulic fluid from said first pump to the steering cylinder;
   an accumulator for storing energy needed for auxiliary steering;
   a second engine-driven pump connected to supply hydraulic fluid to said accumulator;
   a charge/discharge valve interposed between said second pump and said accumulator;
   a charge conduit connected to said charge/discharge valve and the output of said first pump;
   a first check valve in the output of said first pump upstream of the connection with said charge conduit; and
   a second check valve interposed between said second pump and said charge/discharge valve.

2. The invention according to claim 1, wherein said second pump is a pressure compensated, variable displacement pump.

3. The invention according to claim 2, wherein said first pump is a fixed displacement pump.

* * * * *